United States Patent [19]
Kraske

[11] Patent Number: 5,841,890
[45] Date of Patent: Nov. 24, 1998

[54] MULTI-DIMENSIONAL WAVELET TOMOGRAPHY

[75] Inventor: Wolfgang F. Kraske, Whittier, Calif.

[73] Assignee: Northrop Grumman Corporation, Los Angeles, Calif.

[21] Appl. No.: 643,584

[22] Filed: May 6, 1996

[51] Int. Cl.$^6$ .................................................. G06K 9/00
[52] U.S. Cl. .............................. 382/131; 382/276; 378/4
[58] Field of Search .................................... 382/131, 276, 382/277, 260; 364/413.14, 413.16, 413.19, 413.21; 378/21, 4

[56] References Cited

U.S. PATENT DOCUMENTS

| | | | |
|---|---|---|---|
| 4,549,265 | 10/1985 | Deckers et al. | 364/414 |
| 4,694,404 | 9/1987 | Meagher | 364/518 |
| 4,835,690 | 5/1989 | Gangarosa et al. | 364/413.13 |
| 4,884,225 | 11/1989 | Fogarty et al. | 364/559 |
| 4,903,202 | 2/1990 | Crawford | 364/413.13 |
| 4,905,148 | 2/1990 | Crawford | 364/413.1 |
| 4,908,625 | 3/1990 | Anthouard et al. | 342/25 |
| 4,937,526 | 6/1990 | Ehman et al. | 324/309 |
| 4,953,087 | 8/1990 | Crawford | 364/413.18 |
| 4,974,187 | 11/1990 | Lawton | 364/728.01 |
| 4,984,160 | 1/1991 | Saint Felix et al. | 364/413.19 |
| 5,047,931 | 9/1991 | Lin | 364/413.21 |
| 5,068,808 | 11/1991 | Wake | 395/119 |
| 5,090,245 | 2/1992 | Anderson | 73/325 |
| 5,115,394 | 5/1992 | Walters | 364/413.17 |
| 5,128,864 | 7/1992 | Waggener et al. | 364/413.21 |
| 5,144,687 | 9/1992 | Honda | 382/54 |
| 5,148,499 | 9/1992 | Matsumura | 382/54 |
| 5,170,170 | 12/1992 | Soumekh | 342/179 |
| 5,187,660 | 2/1993 | Civanlar et al. | 364/413.19 |
| 5,222,080 | 6/1993 | Wang et al. | 375/99 |
| 5,224,037 | 6/1993 | Jones et al. | 364/413.19 |
| 5,241,471 | 8/1993 | Trousset et al. | 364/413.19 |
| 5,249,123 | 9/1993 | Hsieh | 364/413.19 |
| 5,253,171 | 10/1993 | Hsiao et al. | 364/413.19 |
| 5,257,028 | 10/1993 | Keydel et al. | 342/25 |
| 5,257,182 | 10/1993 | Luck et al. | 364/413.1 |
| 5,263,120 | 11/1993 | Bickel | 395/11 |
| 5,265,013 | 11/1993 | King et al. | 364/413.21 |
| 5,270,926 | 12/1993 | Tam | 364/413.19 |
| 5,561,431 | 10/1996 | Peele et al. | 342/90 |

OTHER PUBLICATIONS

J. Gofman and E. O'Connor; *X–Rays: Health Effects of Common Exams;* 1985; pp. 241–249.

W. Wayt Gibbs; "Making Wavelets"; *Scientific American;* Jun. 1993; pp. 137–138.

Gilbert Strang; "Wavelets"; *American Scientist;* May–Jun. 1994; vol. 82; pp. 250–255.

Mac A. Cody; "The Wavelet Packet Transform"; *Dr. Dobbs's Journal;* Apr. 1994; pp. 44–46, 50, 52, 54.

Stephanie G. Mallat; "A Theory for Multiresolution Signal Decomposition: The Wavelet Representation"; *IEEE Transactions on Pattern Analysis and Machine Intelligence;* Jul. 1989; vol. II, No. 7; pp. 674–693.

Gilbert Strang; "Wavelets and Dilation Equations: A Brief Introduction"; *SIAM Review;* Dec. 1989; vol. 31, No. 4; pp. 614–666.

*Primary Examiner*—Yon J. Couso
*Attorney, Agent, or Firm*—Terry J. Anderson; Karl J. Hoch, Jr.

[57] ABSTRACT

Multi-dimensional wavelet tomography is performed by iteratively projecting a multi-dimensional image across a range of orientations so as to produce a plurality of one-dimensional projections which collectively form a projection image thereof; and then performing wavelet decomposition upon the projection image thereof so as to form a plurality of projection subimages each containing particular boundary and angular characteristics of the original image. Such wavelet decomposition facilitates segmentation and reconstruction of selected characteristics of the original image.

3 Claims, 11 Drawing Sheets

PERIODIC LOW PASS FUNCTION $H_n(\omega)=H_n(\omega+2^{n+1}\pi)$

FIG. 4

PERIODIC HIGH PASS FUNCTION $G_n(\omega)=H_n(\omega+2^n\pi)$

MULTI-DIMENSIONAL WAVELET TOMOGRAPHY

FIELD OF THE INVENTION

The present invention relates generally to tomographic image analysis and relates more particularly to a method for performing multi-dimensional tomographic image analysis by utilizing the wavelet transform to facilitate the segregation of image features, such that only desired image features may be selectively reconstructed.

BACKGROUND OF THE INVENTION

Tomography, particularly as utilized in medical applications, is well known. As those skilled in the art will appreciate, tomographic techniques form the basis of contemporary computer aided tomography (CAT), positron emission tomography (PET) and magnetic resonance imaging (MRI) technologies.

According to the well known principles of tomography, information representative of the original image is contained within multiple projections thereof. These projections are typically generated by rotating the original image and forming the integral sum of the multi-dimensional data set thereof along a particular direction with respect to the original image. This is done for a plurality of different rotational orientations of the image, such that the resulting radial projections are formed from substantially every part of the original image.

Thus, substantially all of the data contained within the original image contributes to the resultant projections. By forming such projections of multi-dimensional data sets onto two-dimensional planes, analysis thereof according to contemporary methodology is facilitated.

The use of the wavelet transform in signal processing is also known. Wavelet processing has been developed to provide for the concise extraction of information from finite one-dimensional data sets, such as a sequence of sounds, e.g., speech, or such as an echo return of range data from a radar or ultrasound sensor. A discussion of the wavelet transform is found in "Making Wavelets" by W. Wayt Gibbs, *Scientific American*, June 1993; "Wavelets" by Gilbert Strang, *American Scientist*, Vol. 82; "The Wavelet Packet Transform" by Mac A. Cody, *Dr. Dobb's Journal*, April 1994; "A Theory For Multi-resolution Signal Decomposition: The Wavelet Representation" by Stephan G. Mallet, *IEEE Transactions on Pattern Analysis and Machine Intelligence*, Vol. 11, No. 7, July 1989; and "Wavelets and Dilation Equations: A Brief Introduction" by Gilbert Strang, *SIAM Review*, Vol. 31, No. 4, December 1989.

As used herein, a finite data set is defined as an array of one-dimensional samples of a signal taken over a limited number of discrete unit intervals, such as the discretely sampled time intervals of a speech data sequence. By one-dimensional, it is meant that the signal can be represented as a single dependant variable, such as, for example, the amplitude of sound as it varies with respect to time.

The wavelet transform is frequently compared to the well known Fourier transform, which is utilized upon discretely sampled, one-dimensional arrays of data and which is properly referred to as the discrete Fourier transform (DFT). The discrete Fourier transform can be coded on a computer as a fast Fourier transform (FFT). As those skilled in the art are well aware, the DFT of a one-dimensional data set quantizes the frequency content of the data set at regular intervals over a selected range of frequencies. Each frequency interval, commonly referred to as a bin, is scaled relative to the content of a frequency within the data set.

Wavelet processing utilizes a similar frequency bin concept to that of the DFT, however, the wavelet transform utilizes frequency intervals based upon the logarithm of the frequency range, as opposed to the uniform bandwidth increments of the frequency range utilized by the DFT.

With the Fourier transform, each wavelet frequency bin is represented in the domain of the data set as a wavelet kernel. To filter or extract each bin of information from the one-dimensional data set, one must use inner product convolution, Equation 1 below, with the wavelet kernel. This data filtering technique is more concisely described by the convolution theorem of signal processing. Equation 2 below presents the principle of the convolution theorem.

I(x) denotes a one-dimensional sampled data set over coordinate x. The range of I is from $-c$ to $+d$. I is a periodic function having a period of 2d.

k(x) denotes a one-dimensional convolution kernel sampled at a coordinate x. The range of k is from $-\alpha$ to $+\beta$.

(I*k)(x) denotes the one-dimensional circular convolution of the data set, I, by the kernel, k.

$$(I*k)(x) = \int_{-c-\alpha}^{d+\beta} dq\, I(q)k(x-q). \tag{1}$$

$\Im\{f(x)\}$ denotes the Fourier transform of the function $f$.

$$F(u) = \Im\{f(x)\}(u) = \frac{1}{2\pi} \int_{-\infty}^{\infty} dx\, e^{-ixu} f(x). \tag{2}$$

Where i is the imaginary number such that $i=(-1)^{1/2}$. The convolution theorem of transform and signal processing states:

$$\Im\{I*k(x)\}(u)=\Im\{I(x)\}(u)\Im\{k(x)\}(u). \tag{3}$$

Another property of the Fourier transform is that piecewise continuous functions can be reconstructed from their respective Fourier transform by the inverse Fourier transform.

$$f(x) = \Im^{-1}\{F(u)\}(x) = \int_{-\infty}^{\infty} dx\, e^{ixu} F(u). \tag{4}$$

The ability of the Fourier transform to select the quantization of individual frequency bins in a data set, although useful, many times does not represent significant information about the data set. The wavelet transform however quantizes a wavelet bin, a group of frequencies, which many times identify an individual feature or important information contained within a data set.

This capability of the wavelet transform to specifically quantize essential pieces of information from a data set facilitates use of the wavelet transform as an interpretation tool, particularly for use in data analysis algorithms and the like. The information selectivity of wavelet filters also facilitate use of the wavelet transform as a data compression tool.

The recursive nature of the wavelet transform algorithm can be conveniently exploited so as to reduce the complexity of the programming and maintenance of such software. Implementation of the wavelet transform algorithm can typically be engineered by system programming utilizing state of the art convolution, data set addition, downsampling and upsampling algorithms.

Downsampling is defined herein as the deletion of every other element, or pixel, in a data set, and upsampling is defined as replicating a neighbor data point for every element of a data set and thus providing a new data point of the same value, either to the right or the left of the original data point, via an interpolation algorithm. Thus, downsampling and upsampling are essentially opposite processes for decreasing and increasing the size of a data file, respectively.

The information quantizing capability of the wavelet transform, relative to the Fourier transform, does not come without some additional computational burdens, however. To process logarithmic scale features, the wavelet transform must process the scale and translational features which facilitate wavelet decomposition, whereas the Fourier transform needs to only process the scale features of a data set.

The scale and wavelet kernels utilized in the wavelet transform are orthogonal, hence correlations are zero between kernels having different $2^n$ scalings of the abscissa, where n is an integer greater than zero, or having different unit translations along the abscissa. Furthermore, the wavelet and scale kernels are normal, i.e., the auto-correlation or correlation of a kernel with itself, results in unity or 1, as a result. A kernel which is both orthogonal and normal is referred to as orthonormal.

Application of the wavelet transform obviates an understanding of the construction of wavelet filters. It is of no coincidence that the great facility of the wavelet transform in digital signal processing derives from the exploitation of fundamental theorems therein. The use of the convolution theorem has already been cited. More importantly to digital signal processing is that periodic functions in the frequency domain are used to generate the digital convolution kernels used in wavelet filtering. This is accomplished according to the Nyquist theorem of signal processing. Hence the periodic generating functions of the wavelet transform can be directly realized from fundamental theorems of digital signal processing.

Apart from the theoretical elegance of the construction of a wavelet filter, one can also appreciate some very pragmatic details concerning filter construction. A most conspicuous fact is that the construction of a wavelet filter is based on the exploitation of periodic high pass and low pass filters. The low pass filter is referred to as a scale filter and the high pass filter is referred to as a wavelet filter.

The periodic high pass and the periodic low pass filters are constructed by utilizing spline polynomials. The 0th order construction is a periodic square wave and the highest order construction is a cosine wave. To intuitively appreciate the construction of the wavelet and the scaling functions, one should first note the $2^n$ factor used to scale the abscissa of the periodic function plots. By using the successive product of incremental scaling of the generating function, $H_n$, one can generate a low pass filter with a $2^m$ cutoff, named the scaling function. Furthermore, by the judicious use of the function $G_m$, a bandpass filter can be constructed. The formal mathematical expression of scaling and wavelet functions with the generating function is given in Equations 5 and 6.

$$\text{Scaling function } \Phi_n(\omega) = \prod_{k=n+1}^{\infty} H(2^{-k}\omega) \quad \text{(low pass)} \quad (5)$$

The phase function $Q(\omega+\pi)$ is linear in $\omega$ if the phase is minimum.

$$\text{Wavelet function } \Psi_n(\omega) = e^{jQn(\omega+\pi)} G_n(\omega) \Phi_n(\omega) \text{(band pass)} \quad (6)$$

The arbitrary phase function of Equation 6 is tuned so as to assign specific properties to the wavelet kernel, such as continuity, compactness and orthogonality, which are discussed in detail below.

Thus, although the use of the discrete Fourier transform has proven generally suitable for use in image analysis, it does possess inherent deficiencies which detract from its overall effectiveness and which prevent it from being utilized to segregate detailed image information, particularly information regarding the presence of particular geometric structures within an image. As such, it is beneficial to provide a means for employing the wavelet transform to multi-dimensional tomographic images, so as to facilitate the segregation of image features, such that only desired image features may be selectively reconstructed.

SUMMARY OF THE INVENTION

The present invention specifically addresses and alleviates the above-mentioned deficiencies associated with the prior art. More particularly, the present invention comprises a method for performing multi-dimensional wavelet tomography, the method comprising the steps of: iteratively projecting a multi-dimensional image so as to produce a plurality of one-dimensional projections thereof and then performing wavelet decomposition upon the one-dimensional projections. Wavelet decomposition facilitates the segmentation and reconstruction of a selected portion of the original image. Thus, only the desired portion of the original image can be selectively reconstructed from the wavelet decomposed one-dimensional projections thereof. Such segmentation and reconstruction facilitates various machine vision, image processing, and related algorithmic techniques.

For example, when wavelet decomposition is applied to the one-dimensional projections defining an MRI data set, then it is possible to form a reconstructed image which substantially contains only those anatomical structures of interest. In this manner, it is possible to isolate internal organs from bones and/or muscle, for example. It is also possible to isolate substructures having particular geometric characteristics. Thus, tumors, for instance, may be separated from surrounding tissue so as to provide a better view and/or analysis thereof.

Such reconstructed image features are suitable for both viewing and for subsequent image processing. Thus, such reconstructed image features may be utilized to form two-dimensional pictures, or may alternatively be provided to a machine vision, image processing, or similar algorithm.

The plurality of one-dimensional projections is preferably formed by taking projections at different rotational orientations of the multi-dimensional image. That is, the object upon which tomological scanning is being performed is typically rotated about an axis thereof (or, alternatively, the source and sensor are rotated instead), as is common in computer aided tomography (CAT), positron emission tomography (PET), and magnetic resonance imaging (MRI).

The multi-dimensional original image may comprise either a physical object, such as a human being for CAT, PET, and MRI applications, or may alternatively comprise a data set, typically representative of a previously scanned physical object.

The step of iteratively projecting an original image preferably comprises iteratively forming Radon projections thereof, as is typical in contemporary tomographic applications. Further, the step of iteratively projecting an original image preferably comprises forming the integral sum of the multi-dimensional data set along a particular direction, according to contemporary tomological methodology.

Thus, according to the present invention, a multi-dimensional image is reduced to a series or array of one-dimensional projections thereof. For example, a three-dimensional image can be projected so as to form two-dimensional projections thereof, and the resultant two-dimensional image is then projected so as to form one-dimensional projections thereof, thus reducing the data set from three dimensions to a single dimension. According to the preferred embodiment of the present invention, the step of performing wavelet decomposition upon the one-dimensional projections comprises convolving the one-dimensional projections to form a scale filtered subimage and a wavelet filtered subimage, then downsampling the scale filtered subimage and the wavelet filtered subimage. The convolving and downsampling steps are iterated sufficiently to obtain the desired resolution.

The step of convolving the one-dimensional projections comprises filtering the one-dimensional projections through a high pass filter to form a wavelet filtered subimage and generally simultaneously filtering the one-dimensional image through a low pass filter to form a scale filtered subimage. The high pass filter and the low pass filter preferably have complimentary frequency ranges, i.e., the 3 dB rolloff point of the high frequency end of the low frequency filter is approximately equal to the 3 dB rolloff point of the low frequency end of the high frequency filter.

The step of reconstructing a desired portion of the original image preferably comprises back projection filtering of the wavelet decomposed one-dimensional projections. Such back projection filtering comprises upsampling a scale filtered subimage and a wavelet filtered subimage, convolving the upsampled scale filtered subimage and the upsampled wavelet filtered subimage, and combining the convolved upsampled scale filtered subimage and wavelet filtered subimage.

According to the preferred embodiment of the present invention, wavelet decomposition is performed upon the one-dimensional projections by performing both horizontal and vertical wavelet decomposition upon a two-dimensional array formed from the one-dimensional projections. In this manner, two-dimensional wavelet decomposition is effectively preformed upon the array.

Thus, the step of performing wavelet decomposition upon the one-dimensional projections comprises performing wavelet decomposition upon a two-dimensional array of one-dimensional projections in a first direction to form first scale and wavelet subimages; transposing the first scale and wavelet subimages; and performing wavelet decomposition upon the transposed first scale and wavelet subimages to form a horizontal scale vertical scale subimage, a horizontal wavelet vertical scale subimage, horizontal scale vertical wavelet subimage, and a horizontal wavelet vertical wavelet subimage. This process may be repeated upon one or more of the subimages, as desired.

The step of reconstructing a desired portion of the original image comprises performing one-dimensional wavelet recomposition upon a horizontal scale vertical scale subimage, a horizontal scale vertical wavelet subimage, a horizontal wavelet vertical scale subimage, and/or a horizontal wavelet vertical wavelet subimage. The reconstruction process is substantially the reverse of the decomposition process. Only those subimages containing the desired image features need to be reconstructed in order to reconstruct an image showing those features.

The step of reconstructing a desired portion of the original image comprises transposing a horizontal scale vertical scale subimage, a horizontal scale vertical wavelet subimage, a horizontal wavelet vertical scale subimage, and a horizontal wavelet vertical wavelet subimage; performing one-dimensional recomposition upon the transposed horizontal scale vertical scale subimage and the transposed horizontal scale vertical wavelet subimage to form a first recomposed image and performing one-dimensional recomposition upon the transposed horizontal wave vertical scale subimage and the transposed horizontal wave vertical wave subimage to form a second recomposed subimage; transposing the first and second recomposed subimages, to form a horizontal scale subimage and a horizontal wave subimage, respectively; and performing one-dimensional recomposition upon the horizontal scale subimage and the horizontal wave subimage to form a reconstituted image.

Each recomposition comprises summing pairs of subimages together in order to form subsequent images therefrom. For example, the transposed vertical scale horizontal scale image and the transposed vertical wavelet horizontal scale image are summed with one another during the wavelet one-dimensional recomposition process.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
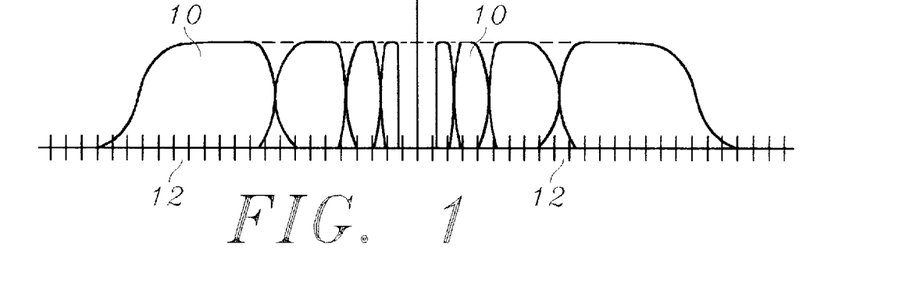
FIG. 1 is a graphical representation of uniform frequency bins as utilized in the discrete Fourier transform (DFT) and logarithmic frequency bins as utilized in the wavelet transform, so as to facilitate a comparison thereof.

The method for performing multi-dimensional wavelet tomography of the present invention is illustrated in FIGS. 1–25 which depict a presently preferred embodiment of the invention. Referring now to FIG. 1, the logarithmic frequency bins 10 associated with the wavelet transform are contrasted with the uniform bandwidth frequency bins 12 associated with the discrete Fourier transform (DFT). As those skilled in the art will appreciate, the frequency bins 12 utilized in Fourier analysis comprise equal bandwidth increments. For example, each uniform frequency bin 12 of a DFT may comprise a bandwidth of 1000 Hz, thus providing frequency bins from 1 Hz to 1,000 Hz, 1,001 Hz to 2,000 Hz, 2,001 Hz to 3,000 Hz, etc.

By way of contrast, the frequency bins associated with wavelet analysis comprise logarithmically increasing frequency bins 10, in which, according to the present invention, each succeeding wavelet bin has twice the bandwidth of the preceding wavelet bin as absolute frequency increases. For example, each logarithmically increasing frequency bin 10 of a wavelet transform comprises a bandwidth twice that of the preceding frequency bin (e.g., 2 Hz, 4 Hz, 8 Hz, 16 Hz, . . . ).

As will be appreciated by those skilled in the art, the use of such logarithmic frequency bins 10 in the wavelet transform facilitates wavelet analysis of a one-dimensional signal to a desired degree of resolution. Thus, as wavelet processing occurs, the number of iterations determines the degree of resolution achieved. This facilitates computational efficiency, since only the number of iterations required to achieve the desired efficiency need to be performed. The degree of resolution is determined by the smallest frequency bin utilized. Thus, the smaller the smallest frequency bin utilized, the greater the resolution.

Thus, wavelet processing facilitates the separating of data into different resolutions utilizing a recursive processing structure. Tomography, as discussed in detail below, facilitates the projection of multi-dimensional data sets into an array of one-dimensional data sets which can thus be processed with wavelets.

Each frequency interval or bin 10 is scaled relative to the frequency content of the data set being processed so as to provide the desired resolution. According to the preferred embodiment of the present invention, this scaling is practiced utilizing an integer increment of the logarithm of 2, such that $2^n$ discrete Fourier transform frequency units constitute the same frequency range as n unit wavelet bins. As those skilled in the art will appreciate, various other logarithmic increments of the frequency bins are likewise suitable.

The ability of the Fourier transform to provide selected quantization of individual frequency bins in a data set is useful. However, as those skilled in the art will appreciate, the Fourier transform lacks substantial information regarding the original data set. The wavelet transform, however, quantizes a wavelet bin, i.e., a band of frequencies, which many times identifies an individual feature or other important piece of information regarding the original data set. It is this particular capability of the wavelet transform to specifically quantize such essential information from the data set which allows the wavelet transform to be an important interpretation tool for data analysis algorithms. This information selectivity of wavelet filters also facilitates use of the wavelet transform as a data compression tool.

As those skilled in the art will appreciate, the principles of tomography, as they apply to image processing, involve the use of projection, convolution, rotation, and back projection algorithms. Projection comprises taking of the integral sum of a multi-dimensional data set along a particular direction. This is often referred to as Radon projection, and is performed according to well known principles. Projection along a particular direction effectively eliminates one dimension from a multiple-dimension data set.

As mentioned above, the recursive nature of the algorithms utilized in the wavelet transform facilitates computer coding in a manner which reduces the complexity of the software, thereby simplifying programming and software maintenance. Implementation of the wavelet algorithm can typically be performed utilizing contemporary convolution, data set addition, downsampling, and upsampling algorithms. As used herein, the term downsampling is defined to indicate the selection of every other element, or pixel, in a data set and the term upsampling is defined as the opposite, i.e., the replication of every element of a data set, typically to have the same value as a neighboring element. Those skilled in the art will appreciate that various means for interpolating data elements during the upsampling process are likewise suitable.

The information quantization capability of the wavelet transform, relative to the Fourier transform, does involve some additional computational burdens. More particularly, in order to process the logarithmic scale features, the wavelet transform must process both scale and translational features in the wavelet decomposition, whereas the Fourier transform needs only to process the scale features of a data set.

Figure 2:
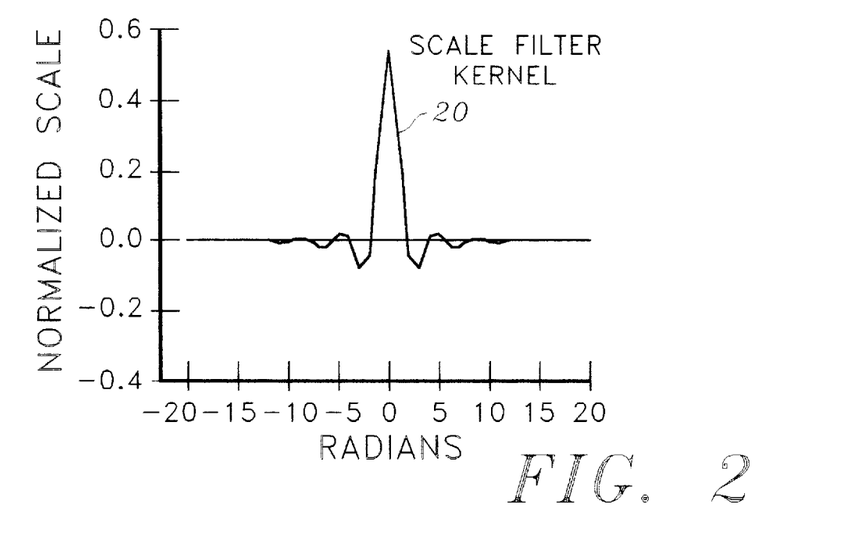
FIG. 2 is a graphical representation of a one-dimensional scale filter kernel.
Figure 3:
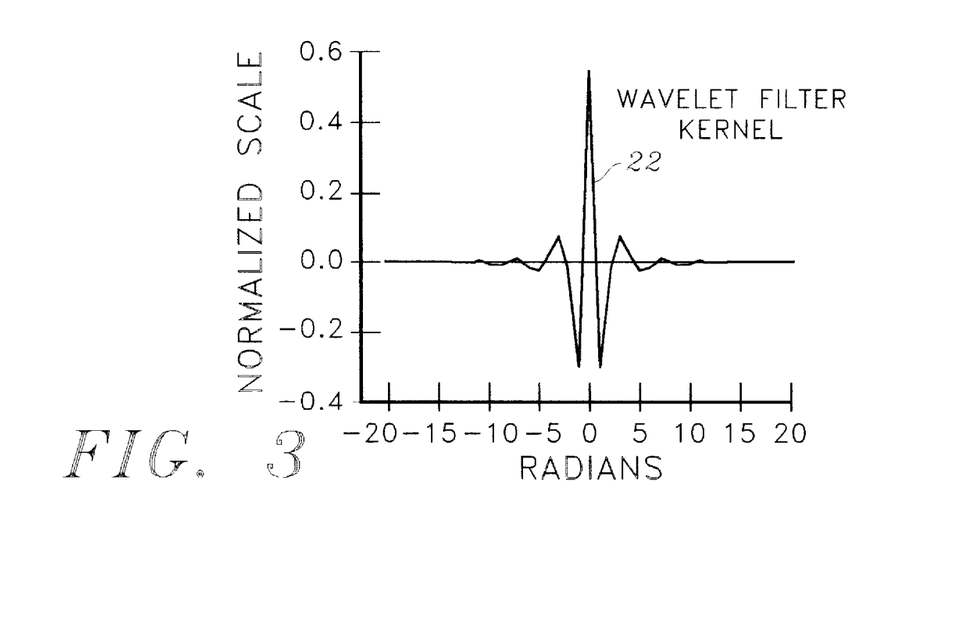
FIG. 3 is a graphical representation of a one-dimensional wavelet filter kernel.

Referring now to FIGS. 2 and 3, the scaling or high frequency filter and the wavelet or low frequency filter kernels are illustrated, respectively. It is important to note that both the scaling and wavelet kernels are orthogonal, thus correlations between such kernels having different $2^n$ scaling of the abscissa are 0, where n is an integer greater than 0. The correlation between wavelet kernels having unit translations with respect to one another along the abscissa are also 0.

Figure 4:
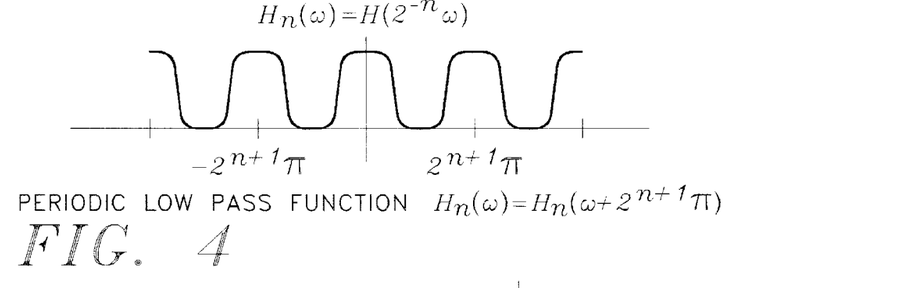
FIG. 4 is a graphical representation of a periodic low pass function as used to generate a scale filter kernel.
Figure 5:
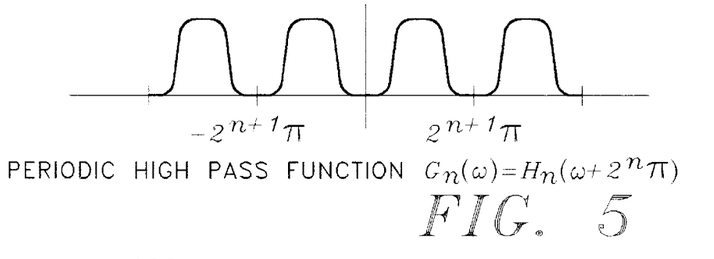
FIG. 5 is a graphical representation of a periodic high pass function as used to generate a wavelet filter kernel.

Referring now to FIGS. 4 and 5, periodic functions in the frequency domain are utilized to generate the digital convolution kernels for the low pass filter (FIG. 2) and the high pass filter (FIG. 3), respectively. These kernels are utilized in wavelet filtering according to the well known Nyquist theorem of signal processing. Thus, the periodic generating functions of the wavelet transform kernels illustrated in FIGS. 4 and 5 can be directly obtained from the fundamental theorems of digital signal processing, i.e., the convolution theorem and the Nyquist theorem. The construction of wavelet filters is based upon the exploitation of periodic high pass and low pass filters, according to well known principles.

The periodic high pass and low pass filter functions of FIGS. 4 and 5 are constructed by utilizing user supplied polynomials. The 0th order construction is a periodic square wave and the highest order construction is a cosine wave. By utilizing the successive product of incremental scaling of the generating function $H_n$, one can generate a low pass filter with an $2^n$ cutoff, referred to as the scaling function. Furthermore, via use of the function $G_m$, a bandpass filter can be constructed. The formal mathematical expressions of the scaling and wavelet functions along with the generating function is provided in Equations 5 and 6 below:

$$\text{Scaling function } \Phi_n(\omega) = \prod_{k=n+1}^{\infty} H(2^{-k}\omega) \text{ (low pass)} \quad (5)$$

$$\text{Wavelet function } \Psi_n(\omega) = e^{jQ_n(\omega+\pi)} G_n(\omega)\Phi_n(\omega)\text{(band pass)} \quad (6)$$

where:

The periodic low pass function has the formula:

$$H_n(\omega) = H_n(\omega + 2^{n+1}\pi)$$

The periodic high pass function has the formula:

$$G_n(\omega) = H_n(\omega + 2^n\pi)$$

The periodic normalization constant is:

$$1 = |H_n(\omega)|^2 + |G_n(\omega)|^2$$

The phase function $H_n$ ($\omega+\pi$) is linear in $\omega$ if the phase is minimum.

The arbitrary phase function of Equation 6 is tuned to assign specific properties of continuity, compactness, and orthogonality to the wavelet kernel. Compactness refers to the extent of the boundary or the number of elements of non-zero value.

Figure 6:
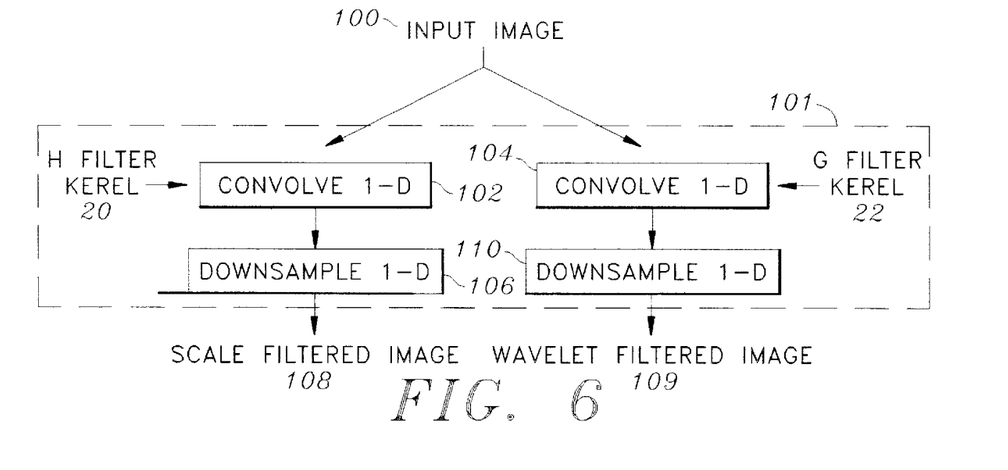
FIG. 6 is a block diagram showing the steps comprising wavelet one-dimensional horizontal image decomposition.

Referring now to FIG. 6, an algorithm for implementing one-dimensional wavelet transform decomposition is shown. One-dimensional wavelet transform decomposition comprises providing an input image 100 and then convolving 102 the input image 100 utilizing the H or scaling filter kernel 20 generated from the low pass function of FIG. 4, while generally simultaneously convolving 104 the input image 100 utilizing the G or wavelet filter kernel 22 generated from the periodic high pass function of FIG. 5.

After convolving the input image 100 utilizing the scaling filter kernel 20, the convolved input image is downsampled 106 to provide the scaled filter image 108. Similarly, the input image 100, which is convolved 104 utilizing the wavelet filter kernel 22, is downsampled 110 to provide the wavelet filtered image 109.

Further, it will be appreciated by those skilled in the art that downsampling during the image decomposition process is necessary only if it is desirable to maintain the same image size. If computational resources permit, it may be desirable to omit such downsampling procedure.

Figure 7:
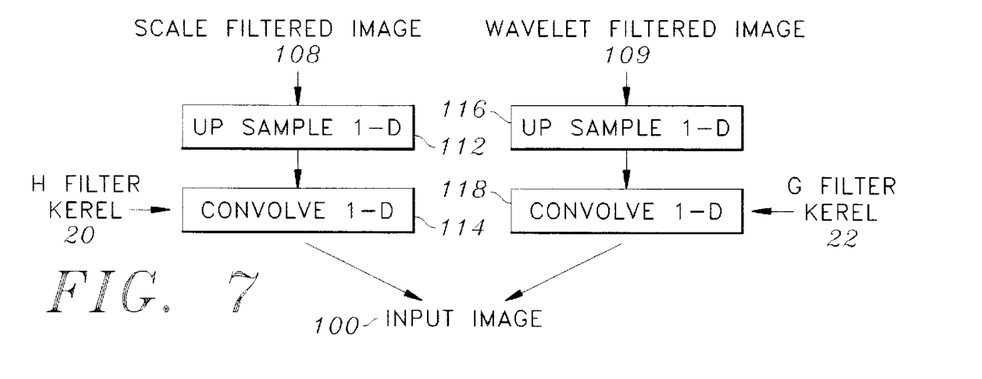
FIG. 7 is a block diagram showing the steps comprising wavelet one-dimensional horizontal image recomposition.

Referring now to FIG. 7, an algorithm for implementing wavelet transform reconstruction is shown. According to the present invention, the scaled filter image 108 is upsampled 112 and the upsampled scale filter image is then convolved 114 utilizing the H or scaling filter kernel 20. Generally simultaneously, the wavelet filter image 109 is upsampled 116 and then convolved 118 utilizing the G or wavelet filter kernel 22. The upsampled and convolved scale filtered image is then combined with the upsampled and convolved wavelet filtered image to form the original input image 100.

Thus, the process of wavelet one-dimensional horizontal image recomposition is merely the reverse of the process of wavelet one-dimensional horizontal image decomposition. That is, the steps of convolving and downsampling as utilized in the decomposition process are reversed to effect recomposition of the original image.

Figure 8:
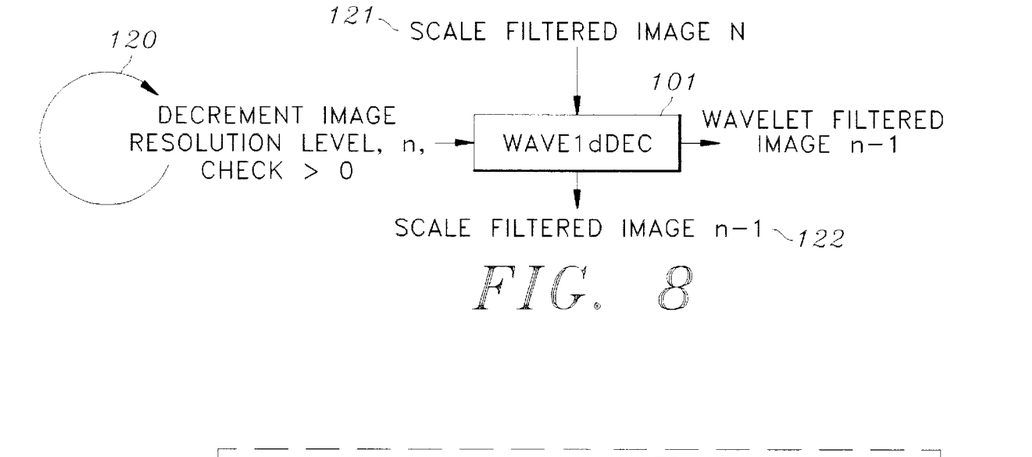
FIG. 8 is a block diagram showing the wavelet one-dimensional decomposition loop utilized to decompose an image into N horizontal resolution levels having N image components.

Referring now to FIG. 8, recursive execution of the wavelet one-dimensional decomposition algorithm of FIG. 6 is performed on successively smaller scales of the data until the scales have been exhausted, i.e., the desired resolution has been attained. Thus, the wavelet one-dimensional decomposition 101 is repeated upon successive scale filtered images n 121, while decrementing the image resolution level 120, until the desired level of resolution is attained, so as to obtain the scale filtered image 122.

In a similar fashion, the steps of upsampling 112 and 116 and convolving 114 and 118 are repeated during the wavelet one-dimensional reconstruction process of FIG. 7. This involves applying the wavelet one-dimensional recomposition algorithm on successively larger scale reconstructions of the data until the original scale and data set are restored.

It is worthy to note that the wavelet transform can be optimized according to several independent criteria, so as to maximize the extraction of a particular type of information from a processed image, or so as to enhance the coding of a particular signal processing algorithm. Four criteria utilized to optimize a wavelet kernel to be utilized in the wavelet transformation process are smoothness, orthogonality, compact support, and minimum phase of the kernel. Only three of the four optimization criteria can be satisfied simultaneously.

A perfectly smooth kernel is most desirable. As those skilled in the art will appreciate, a perfectly smooth kernel has no discontinuities, and is therefore infinitely differentiable. Continuity can be provided by developing the continuity of the wavelet kernel up to a certain derivative, and then subsampling the kernel utilizing a wave processing algorithm, so as to eliminate existing discontinuities.

A wavelet kernel is orthogonal if, when convolved with any $2^n$, n>0, scaling or translation of the same wavelet kernel, zero correlation with the original wavelet kernel is obtained.

For discrete applications on finite data sets, compact support and minimum phase are desirable processing characteristics. If a particular generating function lacks minimum phase, then the recomposition filters may differ from the decomposition filters, typically varying only in phase.

In order to process multi-dimensional data sets, the wavelet transform is implemented by one-dimensional wavelet processing along orthogonal coordinates upon the data set. Such processing may be effected upon a two-dimensional image, for example, by first applying the wavelet and scale convolution filters in the horizontal direction, and then repeating the application in the vertical direction upon the image. Such a transformation procedure yields four subimages after downsampling. These four subimages may be characterized as horizontal scale (HS), vertical scale (VS), horizontal wavelet (HW), and vertical wavelet (VW) subimages.

Figure 9:
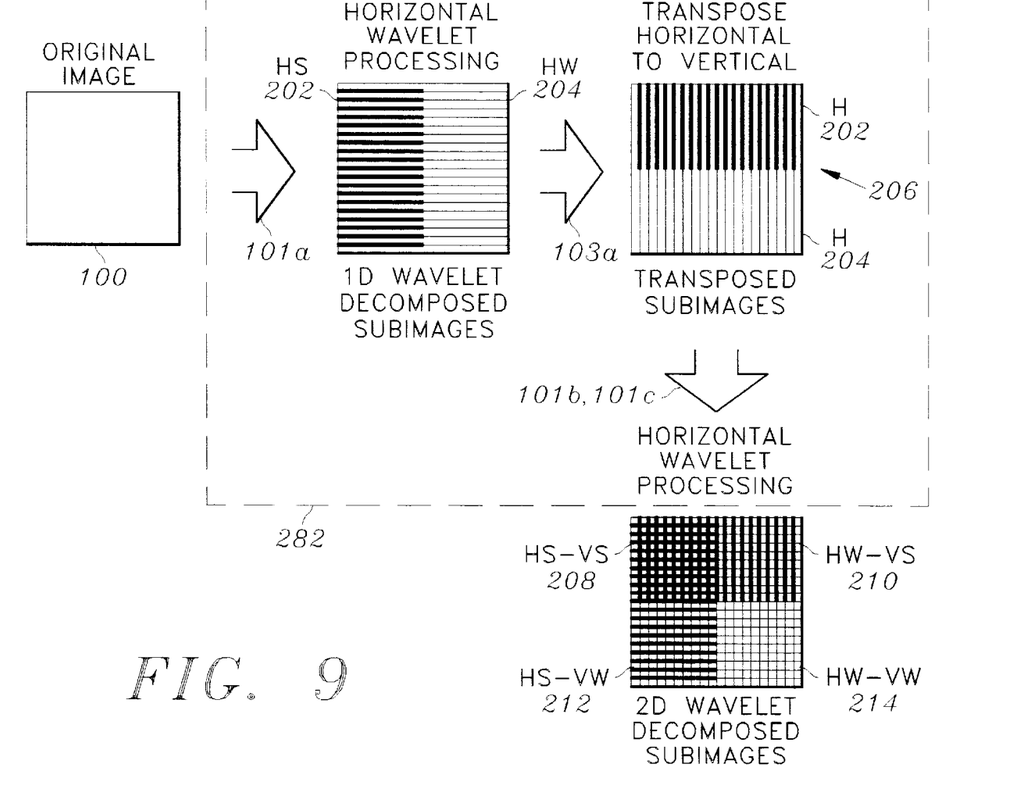
FIG. 9 is a graphical representation of two-dimensional wavelet decomposition showing both the horizontal wavelet processing and the transposition steps thereof.

Referring now to FIG. 9, the general process for forming these four subimages, by decomposing a two-dimensional image with wavelets, is shown. The original image 100 is first subjected to one-dimensional wavelet decomposition 101a, as shown in further detail in FIG. 6, so as to form separate horizontal scale 202 and horizontal wavelet 204 subimages. Next, the data points of the two-dimensional array are transposed 103a so as to form the transposed image 206. Such transposition of the image merely comprises swapping the rows and columns thereof, such that, for example, row n becomes column n and column n becomes row n.

Next, horizontal wavelet processing 101b is performed upon the transposed horizontal scale image while horizontal wavelet processing 101c is generally simultaneously performed upon the horizontal wavelet image so as to form separate horizontal scale vertical scale 208, horizontal wavelet vertical scale 210, horizontal scale vertical wavelet 212, and horizontal wavelet vertical wavelet 214 subimages.

Figure 10:
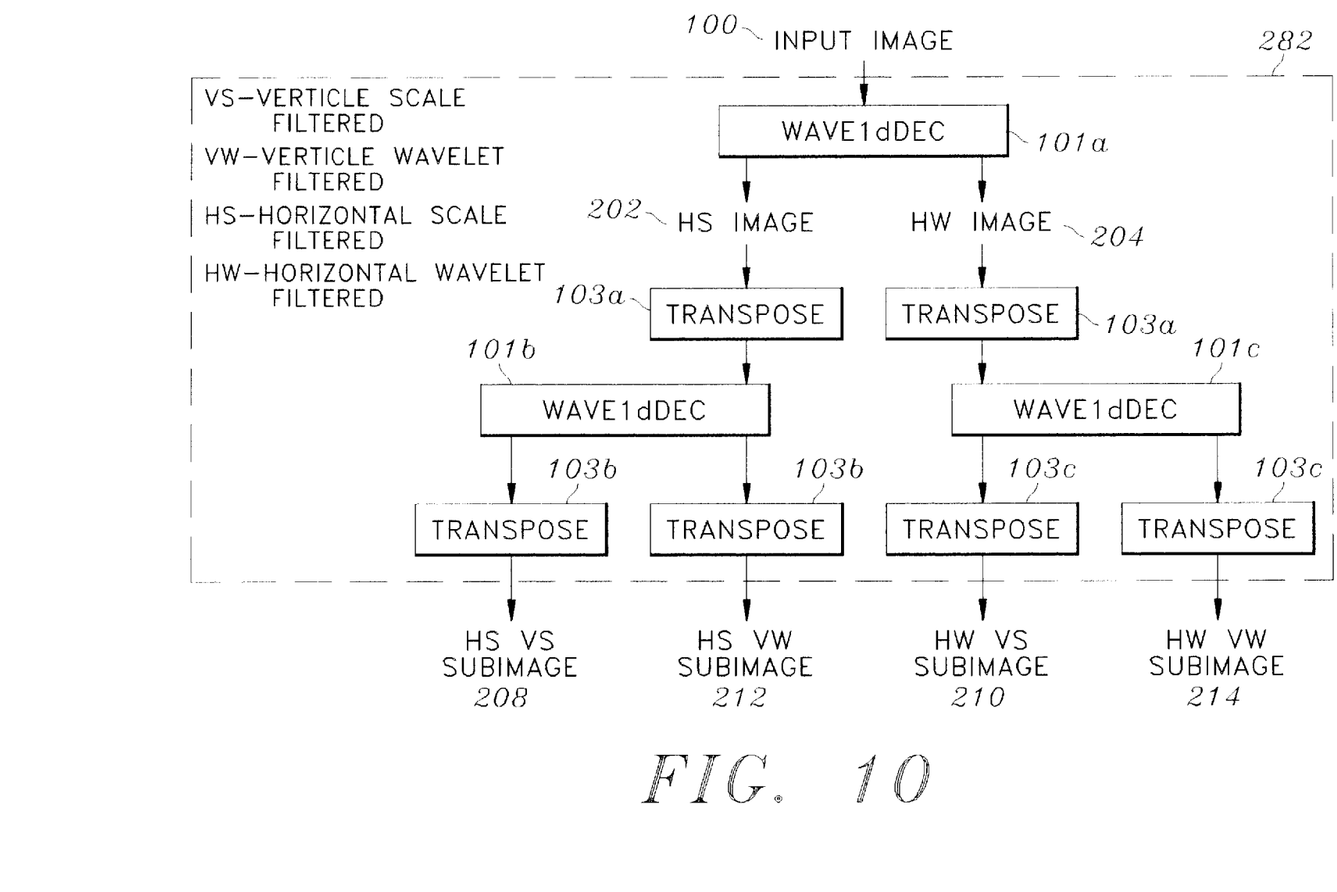
FIG. 10 is a block diagram showing wavelet two-dimensional horizontal and vertical image decomposition.

Referring now to FIG. 10, the process of forming the horizontal scale vertical scale 208, horizontal wavelet vertical scale 210, horizontal scale vertical wavelet 212 and horizontal wavelet vertical wavelet 214 subimages is shown in block diagram form. The input image 100 is subjected to wavelet one-dimensional decomposition 101a to form a horizontal scale image 202 and a horizontal wavelet image 204. The rows and columns of the subimages 202 and 204 are then transposed 103a and wavelet one-dimensional decomposition 101b is then performed upon the transposed horizontal scale image 202 while wavelet one-dimensional decomposition 101c generally simultaneously is performed upon the transposed horizontal wavelet image 204.

Transposing 103b the wavelet decomposed and transposed horizontal scale image 202 provides a vertical scale horizontal scale subimage 208 and a vertical wavelet horizontal scale subimage 212. Likewise, transposing 103c the wavelet decomposed and transposed horizontal wavelet image 204 provides a horizontal wavelet vertical scale subimage 210 and a horizontal wavelet vertical wavelet subimage 214.

Figure 11:
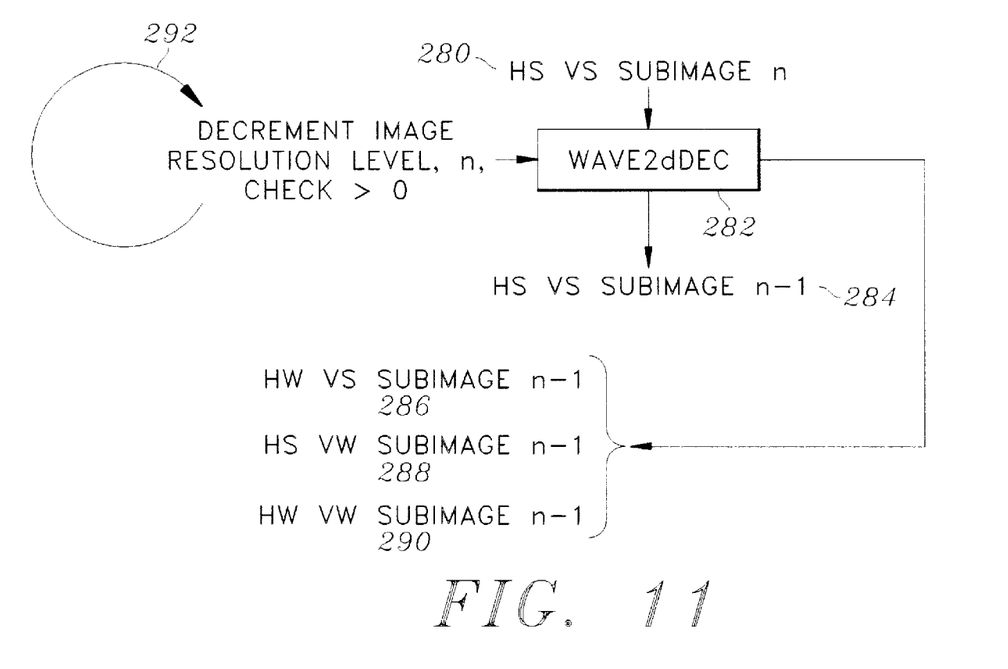
FIG. 11 is a block diagram showing the wavelet two-dimensional decomposition loop wherein an image is decomposed into N horizontal/vertical resolution levels, each having $3^N+1$ image components.

Referring now to FIG. 11, the recursive process for performing wavelet two-dimensional decomposition 282 (FIG. 10) upon a selected image 100 is shown in block diagram form. The horizontal scale vertical scale image n 280, for example, is recursively subjected to wavelet two-dimensional decomposition 282. Each iteration provides a new vertical scale horizontal scale image n−1 284. As a byproduct of this process, horizontal wavelet vertical scale subimage n−1 286, horizontal scale vertical wavelet subimage n−1 288, and horizontal wavelet vertical wavelet subimage n−1 290 are also generated. This process is repeated 292, each time decrementing the image resolution level, n, until the desired number of iterations have been performed, i.e., as long as the number of iterations desired is greater than 0. The resolution level n is initially selected so as to provide desired level of resolution. Thus, n defines the number of iterations to which the horizontal scale vertical scale image n is subjected. In this manner, a desired resolution of the final image is provided.

Figure 12:
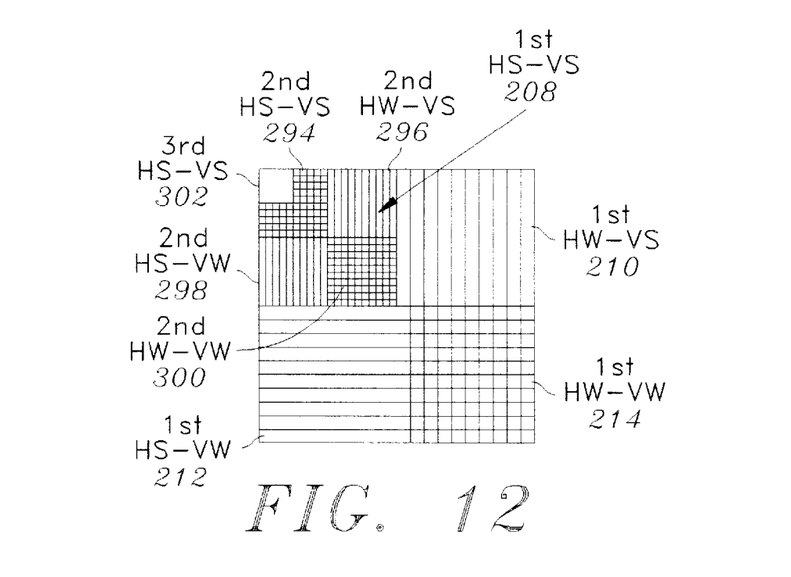
FIG. 12 is a graphical representation of wavelet decomposition after three recursions wherein each square is representative of a particular subimage.

Referring now to FIG. 12, the results of the recursive process for performing wavelet two-dimensional decomposition 282 (FIG. 11) upon a selected image is shown graphically. The first iteration of wavelet two-dimensional decomposition results in first horizontal scale vertical scale subimage 208, first horizontal wavelet vertical scale subimage 210, first horizontal scale vertical wavelet subimage 212, and first horizontal wavelet vertical wavelet subimage 214. The second iteration, which is performed upon the vertical scale horizontal scale subimage 208, in the example shown in FIG. 11, results in second horizontal scale vertical scale subimage 294, second horizontal wavelet vertical scale subimage 296, second horizontal scale vertical wavelet subimage 298, and second horizontal wavelet vertical wavelet subimage 300.

Iterating this process a third time similarly results in a third horizontal scale vertical scale processed image 302. As mentioned above, this process is repeated upon the desired subimage until a desired resolution of the processed image is achieved.

The desired resolution will typically be that resolution required to isolate or segregate desired image components. Generally, the smaller those image components are, the greater resolution required to segregate them. For example, if the original image comprises small circular features which are desired to be segregated therefrom, then recursive wavelet processing must continue until a resolution sufficient to define these features is achieved.

In order to extend such wavelet decomposition processing to higher-dimensional data sets, such as three-dimensional data sets representative of a human being, including anatomical features such as organs, bones, muscles, etc., such as those obtained during CAT, PET and/or MRI procedures, it is merely necessary to develop transposition algorithms which permute each individual index, i.e., row or column, with the first, such that wavelet decomposition is performed on each individual axis.

Given an n-dimensional image array $I(x_1, \ldots, x_n)$ then the permutation of the two coordinates $x_1$ and $x_j$, $j \in \{1, \ldots, n\}$ is an image transposition such that: $T_{1,j}(I(x_1, \ldots, x_j, \ldots)) = I(x_j, \ldots, x_1, \ldots)$.

Figure 13:
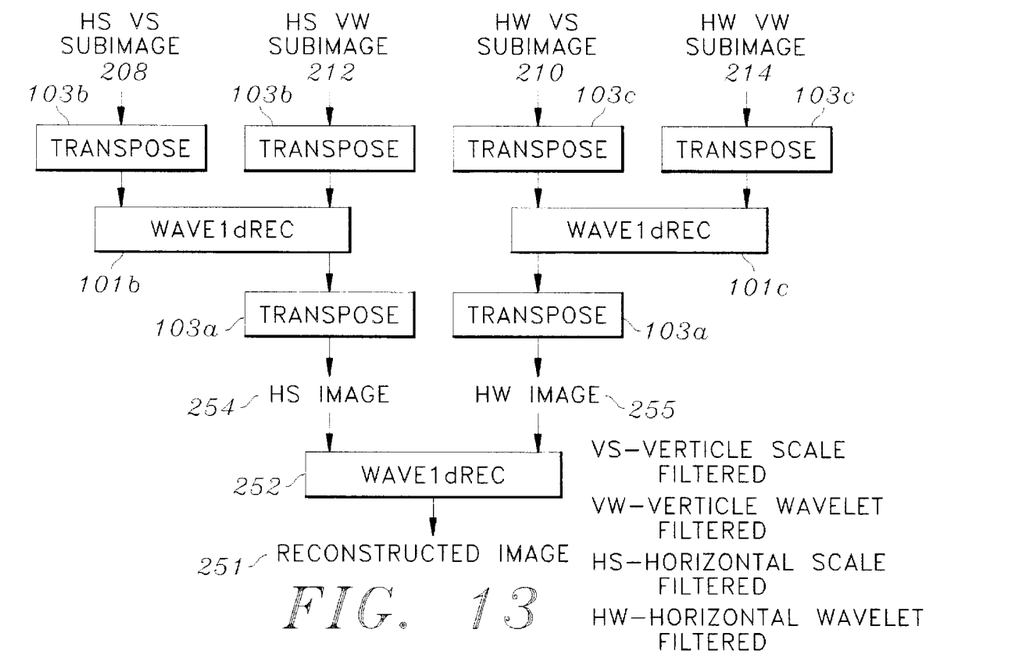
FIG. 13 is a block diagram showing wavelet two-dimensional horizontal and vertical image recomposition.

Referring now to FIG. 13, the image recomposition process is illustrated. It is important to note that image recomposition is merely the reverse of image decomposition, such that the original image can be entirely reconstructed, if desired. However, it is also possible to only utilized selected decomposition elements or subimages, i.e., horizontal scale vertical scale subimage, horizontal scale vertical wavelet subimage, horizontal wavelet vertical scale subimage, and/or horizontal wavelet vertical wavelet subimage, in the recomposition process, so as to selectively isolate particular image features contained therein which are desired for recomposition.

Thus, in order to reconstruct a full image, i.e., one utilizing each of the horizontal scale vertical scale subimage 208, horizontal scale vertical wavelet subimage 212, horizontal wavelet vertical scale subimage 210, and horizontal wavelet vertical wavelet subimage 214, it is necessary to first transpose 103b the horizontal scale vertical scale subimage 208 and the horizontal scale vertical wavelet subimage 212 and then perform wavelet one-dimensional recomposition 101b thereon, to form a wavelet one-dimensional recomposed image which is then transposed 103a to form horizontal scale image 254 which is added to horizontal wavelet image 255, which was similarly formed via transposing 103c of the horizontal wavelet vertical scale subimage 210 with the horizontal wavelet vertical wavelet subimage 214, wavelet one-dimensional reconstruction 101c and transposition 103a, thereby forming wavelet one-dimensional reconstructed image 251, which is substantially identical to the original input image 100 of FIG. 10.

Figure 14:
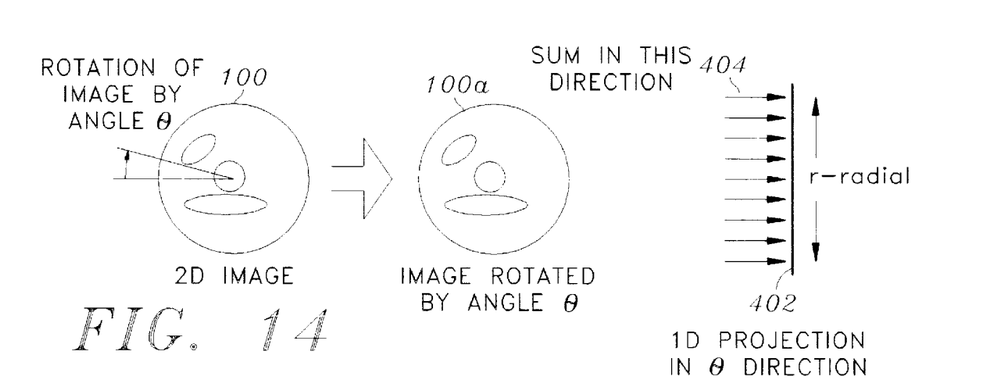
FIG. 14 is shows the rotation of a two-dimensional image about an axis (the axis being perpendicular to the page), thereof so as to facilitate the formation of a one-dimensional projection of the image.

Referring now to FIG. 14, projection and rotation of a two-dimensional data set are shown. The original image or two-dimensional data set 100, which may be representative of a tomographic slice generated from a CAT, PET, or MRI procedure, is projected to form a one-dimensional data set 402 by taking the integral sum thereof, as indicated by arrows 404, at a particular rotational orientation thereof. Each arrow 404 represents a particular integral sum taken along the horizontal direction through the two-dimensional image 100a, so as to form the one-dimensional data set 402.

Thus, the one-dimensional data set 402 comprises a series of data points, wherein each data point corresponds to a particular integral sum taken through the original to the image 100a. In order to form successive one-dimensional data sets, so as to form a two-dimensional array thereof, the image is rotated thus by angle θ to a new position 100a and the process is repeated, as described in detail below. This process of rotation and projection is repeated, generally, until all angular orientations of the object have been projected. Thus, if one degree increments are utilized, then 360 separate projections will be performed.

The projection and rotation processes may be performed by a computer solely upon an existing data set, and thus do not necessarily require the tomographic processing of projection data via a biomedical scanner or the like.

Figure 15:
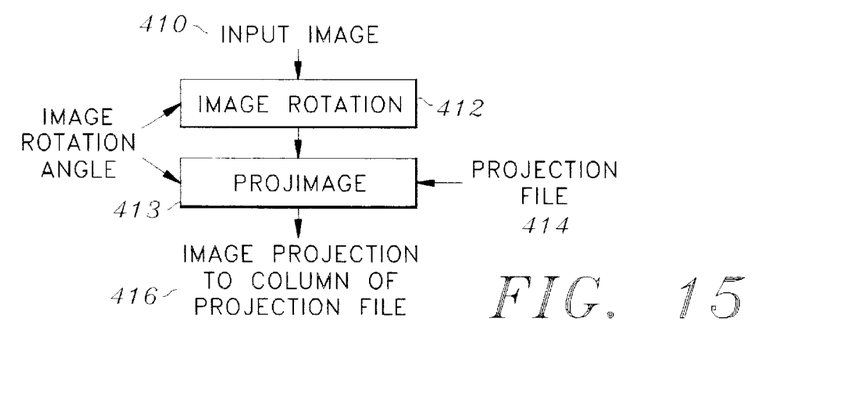
FIG. 15 is block diagram showing the projection of image data into orientation bins, the image projection being provided to a column of a projection file which is indexed by rotation angle.

Referring now to FIG. 15, image projection thus comprises providing an input image 410, rotating 412 the input image 410, and writing the data set to a projection file 414 such that the image projection 413 is written to a column of the projection file 416, and indexed by rotation angle θ.

Figure 16:
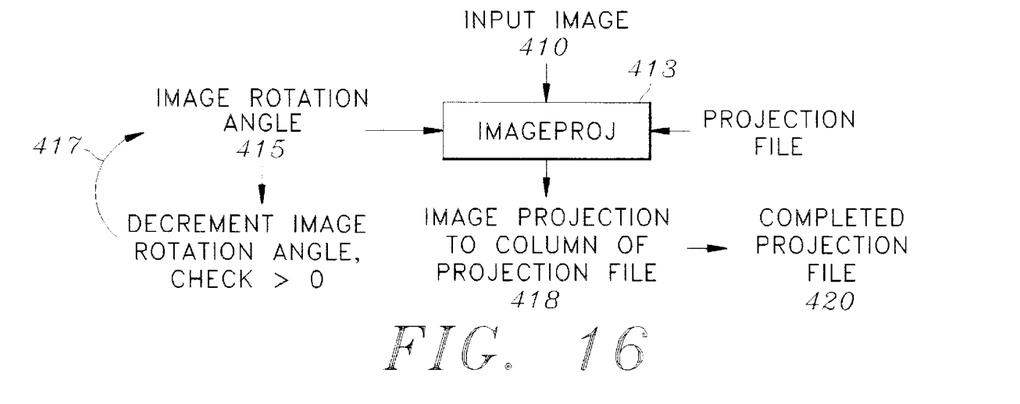
FIG. 16 is a block diagram of the image projection loop wherein image data is projected into orientation bins from 0°–180°.

Referring now to FIG. 16, this process is shown in further detail wherein the input image 410 is subjected to image projection 413 as in FIG. 15. The image is rotated through a preferably fixed rotation angle 415 and the angle is decremented 417 with each image projection until the desired number of angles, typically 360, have been projected. Each image is projected to a column of the projection file 418, so as to form the completed projection file 420.

Figure 17:
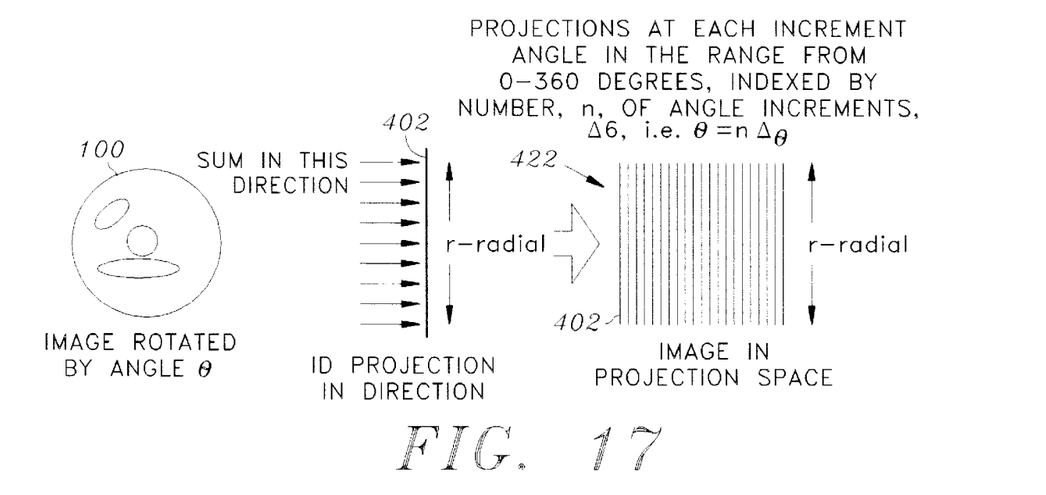
FIG. 17 shows the formation of a two-dimensional array from a series of one-dimensional image projections.

Referring now to FIG. 17, this process is repeated so as to form the two-dimensional array 422 of one-dimensional data sets 402 which are representative of individual projections of the two-dimensional image 100. Thus, each individual column or data set 402 of the two-dimensional array 422 is representative of a particular rotational orientation of the image 100.

In order to apply the concepts of wavelet tomography of the present invention, a multi-dimensional image must be projected down to an array of one-dimensional projections 422 at each desired radial coordinate. Thus, the wavelet transform is performed upon the one-dimensional Radon projections of the rotated image.

Figure 18:
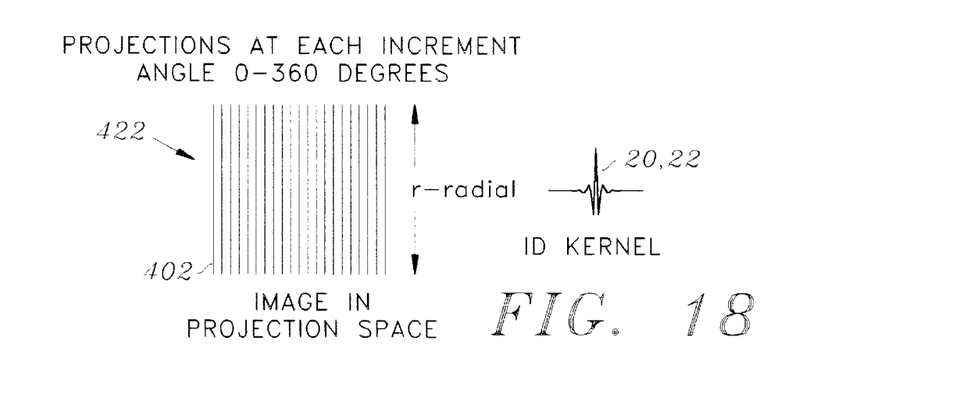
FIG. 18 is a graphical representation of the projections at each increment angle from 0°–360°, i.e., also showing the one-dimensional kernel(representative of both the scale filter and wavelet filter kernels), which is utilized to perform convolution thereupon.
Figure 19:
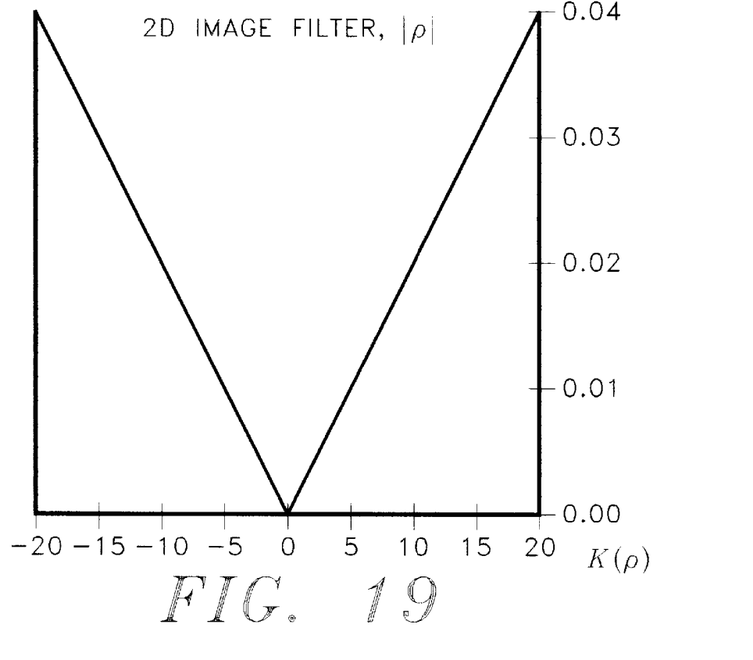
FIG. 19 is a graph showing the frequency space representations of convolution filters for tomographic reconstruction for a two-dimensional image filter.
Figure 20:
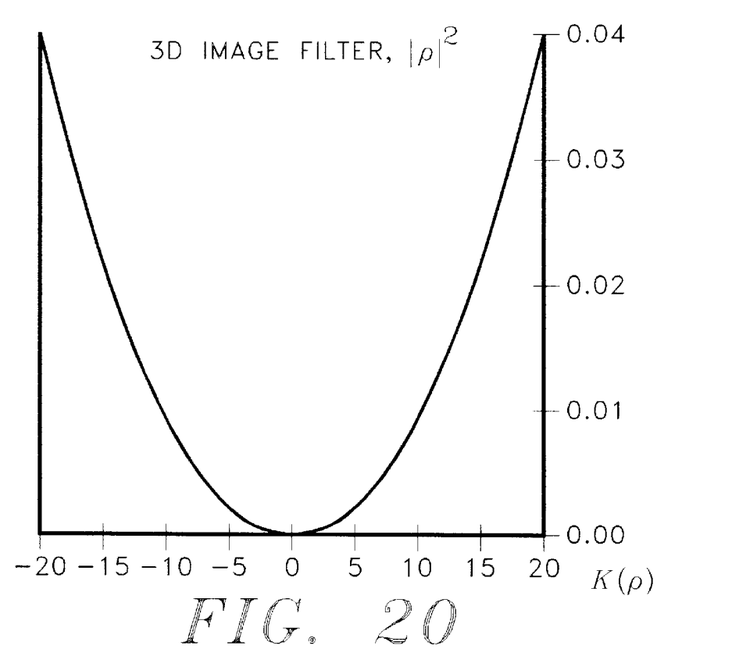
FIG. 20 is a graph showing the frequency space representations of convolution filters for tomographic reconstruction for a three-dimensional image filter.

Referring now to FIG. 18, a one-dimensional kernel, which comprises either the scaling filter kernel 20 or the wavelet filter kernel 22 (depending upon whether low pass filtering or high pass filtering is being performed, respectively), operates upon the array 422 defined by each one-dimensional projection 402. Although, according to the preferred embodiment of the present invention, the one-dimensional kernel 20, 22 operates horizontally and then the two-dimensional array 422 is transposed, the one-dimensional kernel 20, 22 may alternatively operate vertically and then the two-dimensional array 402 can be transposed. In any event, the one-dimensional kernel 20, 22 operates in two orthogonal directions so as to effect two-dimensional wavelet decomposition of the data set.

Reconstruction of the original image from the radial projection data requires the application of a one-dimensional convolution algorithm over the radial direction of the projection image prior to the application of a back projection algorithm, as described in detail below.

It is interesting to note that the Fourier transform of the convolution kernel has the form $|\rho|^{n-1}$, where $\rho$ is the radial frequency coordinate and n is the dimension of the multi-dimensional data set. The radial frequency component thus ranges over both positive and negative values. As such, the spectral distributions of a radial convolution kernel for two-dimensional and three-dimensional image data sets are provided in FIGS. 19 and 20, respectively, where $k(r)=\mathfrak{F}^{-}_1\{K(\rho)\}$ is the derived convolution kernel.

Figure 21:
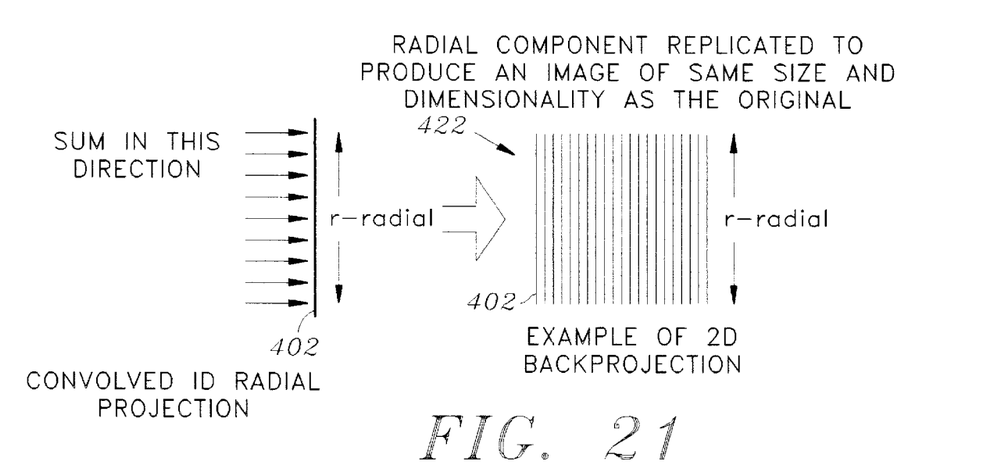
FIG. 21 shows an example of two-dimensional back projection.

Referring now to FIG. 21, by compiling the one-dimensional projections 402 into a two-dimensional array 422 thereof, which is indexed according to the radial position of the image when the projections are taken, back projection is facilitated, as discussed in detail below.

Figure 22:
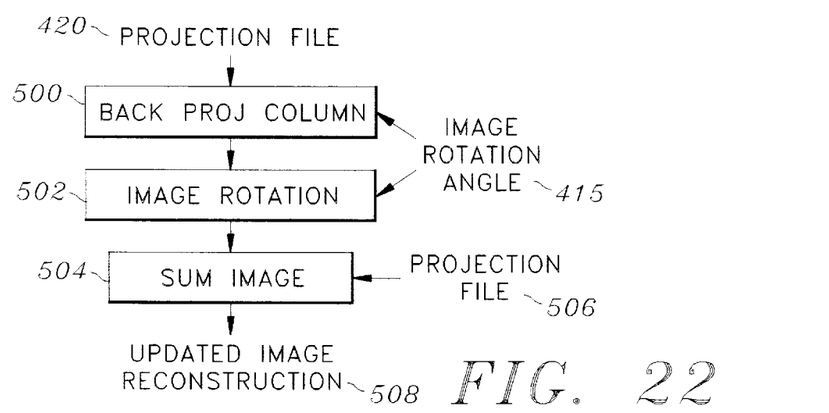
FIG. 22 is a block diagram the back projection of data from the orientation bins.

Referring now to FIG. 22, the process of back projection is shown in further detail. The projection file 420 is subjected to the back projection 500 of columns. Image rotation 502 is effected according to the image rotation angle 415 at which the projections were initially formed. The image is recursively summed 504 with the prior image data of the projection file 506 to effect image reconstruction, thereby providing an updated image reconstruction 508.

Figure 23:
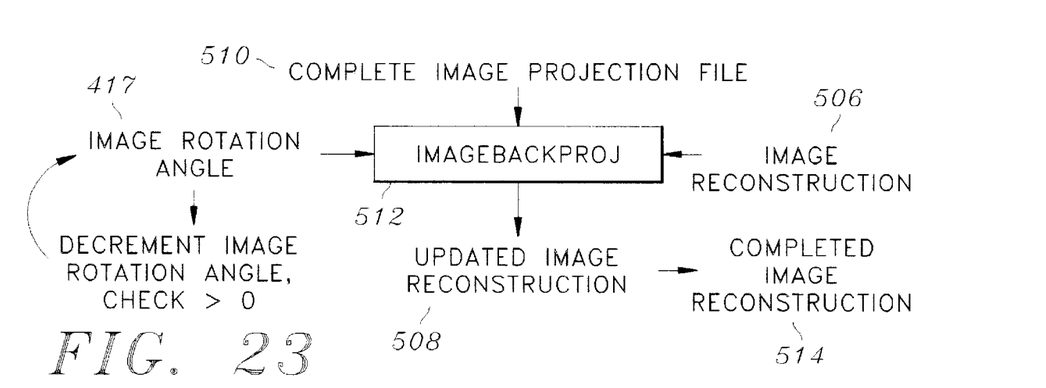
FIG. 23 is a block diagram showing reconstruction of image data from orientation bins from 0°–180° via the image back projection loop.

Referring now to FIG. 23, the image back projection loop comprises utilizes the complete image back projection file 510 to effect image back projection 512. Image reconstruction 506 is provided during the image back projection process to provide an updated image reconstruction 508, as discussed above. This process occurs recursively at the original image rotation angles 417 until a completed image reconstruction 514 is provided.

Thus, if the back projected image is rotated in the reverse sequence of angles from those utilized during the initial projection process, then the data set is positioned in the same orientation as the original projection data. The sum of all of these rotated back projections thus results in a reconstruction of the original image, except for a trivial additive constant which is added to each image element value.

Figure 24:
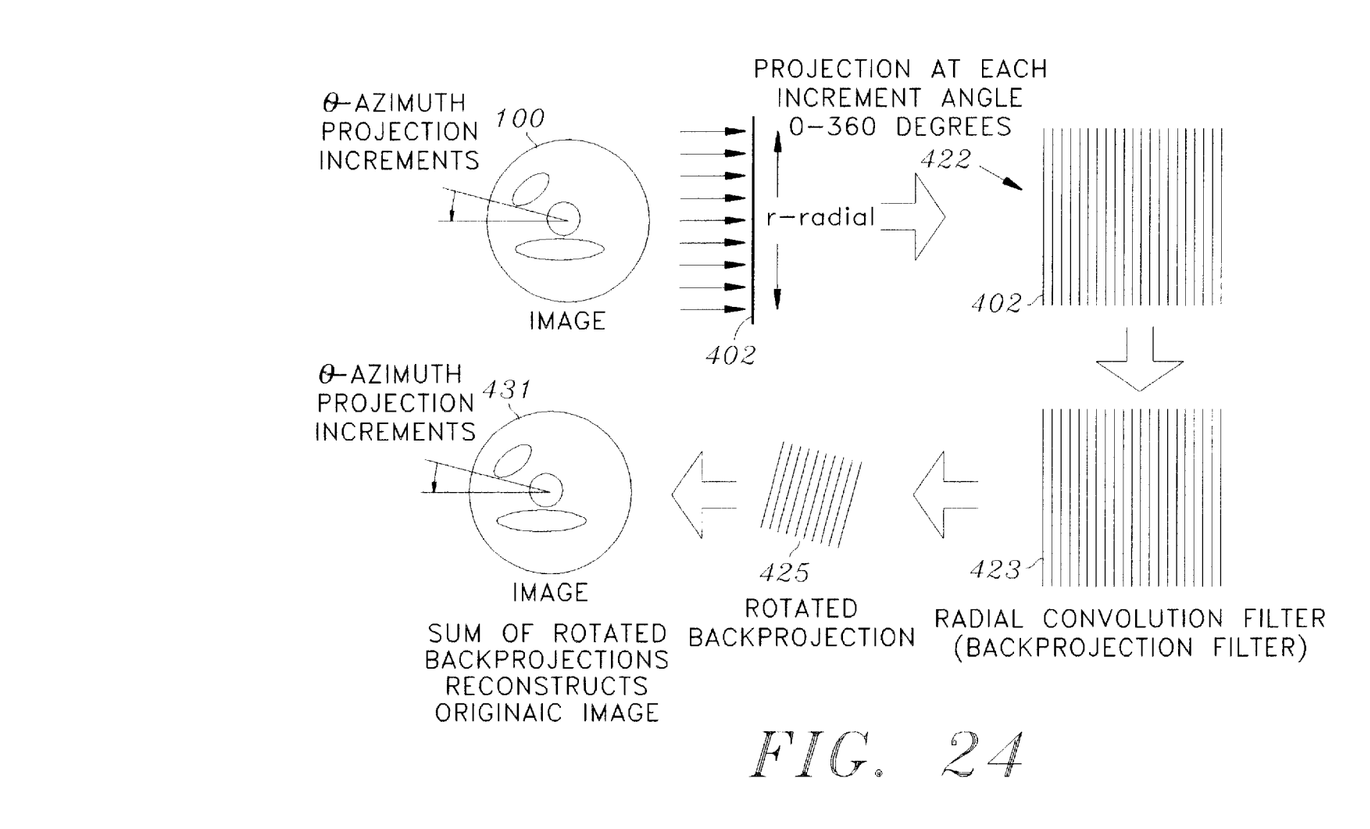
FIG. 24 shows the tomographic reconstruction process without the use of the wavelet transform, such that the reconstructed image contains substantially all of the components of the original image.

Referring now to FIG. 24, the reconstruction process utilizing contemporary tomographic back projection is summarized. The original image 100 is utilized to form projections 402 which then are formed into two-dimensional array 422, as discussed in detail above. A radial convolution filter or back projection filter is then applied to the two-dimensional array to form filtered array 423, which is then subjected to rotated back projection to form rotated array 425. The rotated array 425 is then utilized to reconstruct the original image 431, as discussed above.

Figure 25:
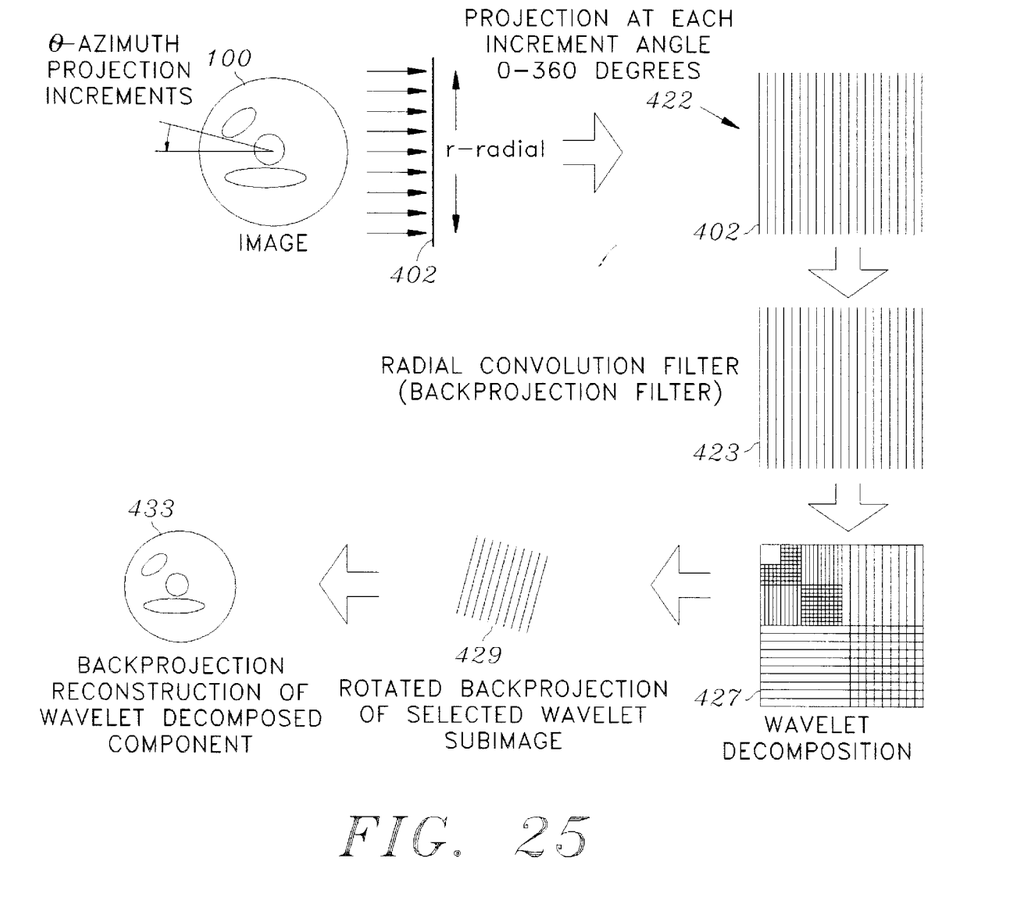
FIG. 25 shows the tomographic reconstruction process, utilizing wavelets, such that only a desired segment of the original image is reconstructed.

Referring now to FIG. 25, in order to practice wavelet tomography according to the present invention, wavelet processing is applied to the radial projection data set. The original image 100 is utilized to form projections 402 which are then formed into an array 422 thereof as is common according to contemporary tomography. The array is then subjected to radial convolution filtering, i.e., back projection filtering, to form filtered array 423. Wavelet decomposition is then applied to the filtered array to form wavelet decomposed array 427. One or more wavelet subimages 429 are then utilized in the rotated back projection process to form back projection reconstruction of the wavelet decomposed component 433.

Thus, to view the tomographic reconstruction of a particular wavelet subimage, it is merely necessary to select the desired subimage and then execute a tomographic back projection reconstruction on that subimage. Typically, wavelet radial processing provides for the enhancement of features in the original image.

Additionally, it is possible to expand a wavelet subimage to the original scale prior to tomographic back projection reconstruction via the use of filtering ω. The use of wavelet tomography or back projection reconstructions of all subimages restored to the original image scale thus provides a subimage set that, when added together, results in a total reconstruction of the original image.

Since the resultant subimages of the image composition process contain valuable boundary, edge, surface and region information, wavelet tomography provides a computationally efficient tool for isolating features or characteristics of an image for use in image understanding algorithms and the like.

It is understood that the exemplary method for multi-dimensional wavelet tomography described herein and shown in the drawings represents only a presently preferred embodiment of the invention. Indeed, various modifications and additions may be made to such embodiment without departing from the spirit and scope of the invention. For example, the wavelet kernels described and depicted are by way of example only, and not by way of limitation. Those skilled in the art will appreciate that various different wavelet kernels are likewise suitable. Indeed, it is expected that wavelet kernels will be optimized for use upon a particular data set, i.e., so as to facilitate the isolation of particular image features. Further, it is understood that the method of the present invention may be utilized upon data sets regardless of their source. Thus, the method of the present invention may be useful in medical imaging, radar imaging and various other forms of data or image analysis. Thus, these and other modifications and additions may be obvious to those skilled in the art and may be implemented to adapt the present invention for use in a variety of different applications.

What is claimed is:

1. A method for performing multi-dimensional wavelet tomography, said method comprising the steps of:
   a) iteratively projecting a multi-dimensional original image so as to produce a plurality of one-dimensional projections thereof;
   b) performing wavelet decomposition upon the one-dimensional projections to form a plurality of subimages thereof, the step of performing wavelet decomposition comprising:
      i) convolving the one-dimensional projections to form a scale filtered subimage and a wavelet filtered image; and
      ii) downsampling the scale filtered subimage and the wavelet filtered subimage;
      iii) wherein steps (i) and (ii) are iterated to obtain a desired resolution;
   c) reconstructing a desired portion of the original image from at least one of said subimages, the step of reconstructing a desired portion of the original image comprising back projection filtering the wavelet decomposed one-dimensional projections, back projection filtering comprising:
      i) upsampling a scale filtered subimage and a wavelet filtered image;
      ii) convolving the upsampled scale filtered image and wavelet filtered image; and
      iii) combining the convolved upsampled scale filtered image and wavelet filtered image.

2. A method for performing multi-dimensional wavelet tomography, said method comprising the steps of:
   a) iteratively projecting a multi-dimensional original image so as to produce a plurality of one-dimensional projections thereof;
   b) performing wavelet decomposition upon the one-dimensional projections to form a plurality of subimages thereof, the step of performing wavelet decomposition comprising:
      i) performing wavelet decomposition upon a two-dimensional array of one-dimensional projections in a first direction to form first scale and wavelet images;
      ii) transposing the first scale and wavelet images; and
      iii) performing wavelet decomposition upon the transposed first scale and wavelet images to form a horizontal scale vertical scale subimage, a horizontal scale vertical wavelet subimage, a horizontal wavelet vertical scale subimage, and a horizontal wavelet vertical wavelet subimage;
   c) wherein such wavelet decomposition facilitates segmentation and reconstruction of a selected portion of the original image.

3. A method for performing multi-dimensional wavelet tomography, said method comprising the steps of:
   a) iteratively projecting a multi-dimensional original image so as to produce a plurality of one-dimensional projections thereof;
   b) performing wavelet decomposition upon the one-dimensional projections to form a plurality of subimages thereof;
   c) reconstructing a desired portion of the original image from at least one of said subimages, the step of reconstructing a desired portion of the original image comprising;
      i) transposing a horizontal scale vertical scale subimage, horizontal scale vertical wavelet subimage, horizontal wavelet vertical scale subimage, and a horizontal wavelet vertical wavelet subimage;
      ii) performing one-dimensional recomposition upon the transposed horizontal scale vertical scale subimage and the transposed horizontal scale vertical scale subimage and the transposed horizontal scale vertical wavelet subimage to form a first recomposed image and performing one-dimensional recomposition upon the transposed horizontal wavelet vertical scale subimage and the transposed horizontal wavelet vertical wavelet subimage to form a second recomposed image;
      iii) transposing the first and second recomposed images, to form a horizontal scale image and a horizontal wavelet image, respectively; and
      iv) performing one-dimensional recomposition upon the horizontal scale image and the horizontal wavelet image to form a reconstructed image.

* * * * *